UNITED STATES PATENT OFFICE.

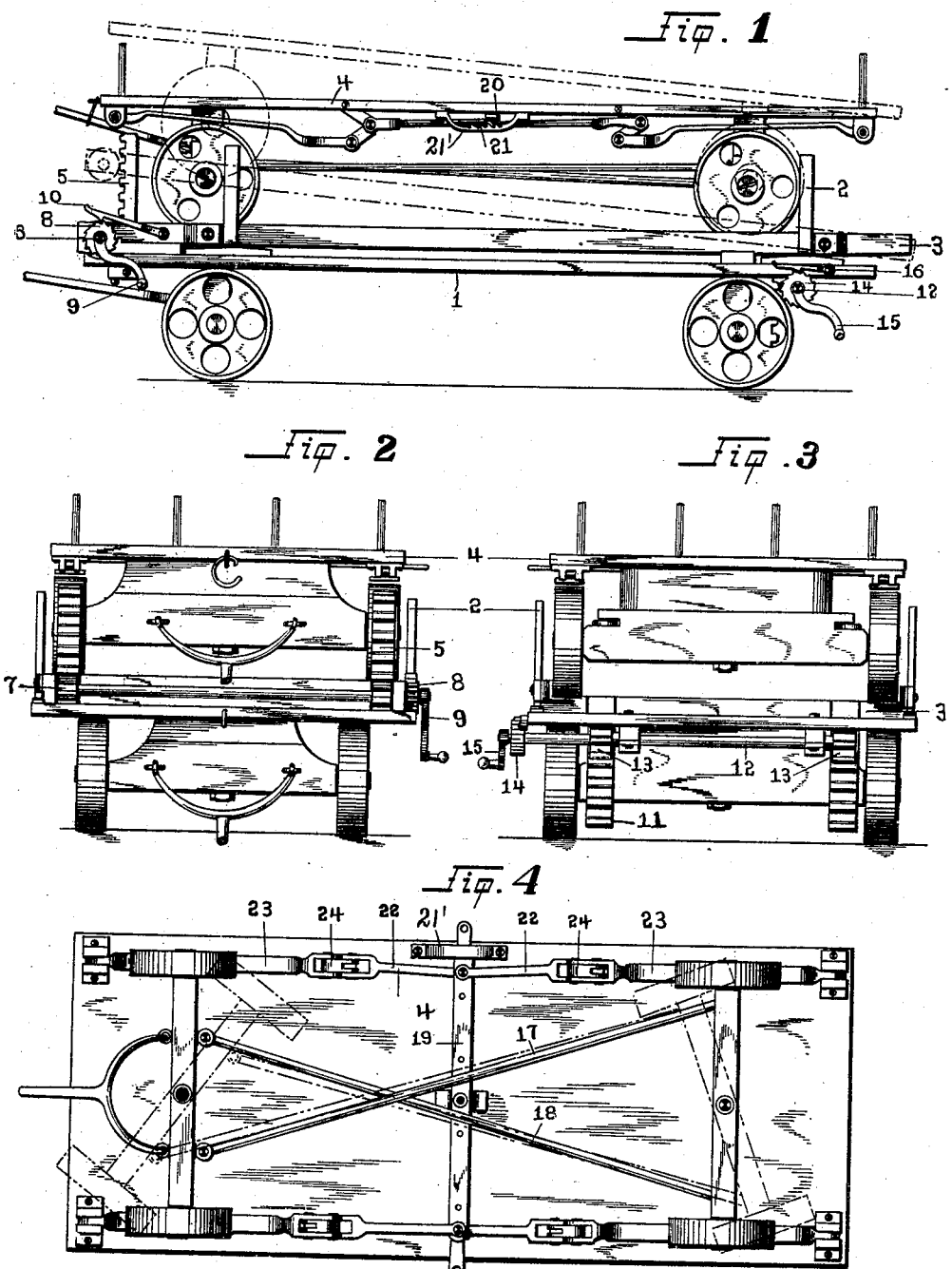

JAMES K. KENDRICK, OF GERMANTOWN, CALIFORNIA.

BAGGAGE-TRUCK.

No. 862,338.      Specification of Letters Patent.      Patented Aug. 6, 1907.

Application filed September 4, 1906. Serial No. 333,157.

*To all whom it may concern:*

Be it known that I, JAMES K. KENDRICK, a citizen of the United States, and a resident of Germantown, in the county of Glenn and State of California, have invented certain new and useful Improvements in Baggage-Trucks; and I do declare the following to be a full, clear, and exact description of the same, such as will enable others skilled in the art to which it appertains to make and use the same, reference being had to the accompanying drawings, and the characters of reference marked thereon, which form a part of this application.

This invention relates to improvements in baggage trucks, my object being to produce a truck which will facilitate the loading of baggage on trains or express cars whereby the same may be done easily and quickly without danger of damaging the baggage. Also a truck which in all its mechanism is designed to be easily handled and operated. These objects I accomplish by providing a main truck having an auxiliary truck operated in connection therewith, and by such other and further novel construction as will appear by a perusal of the following specification and claims.

In the drawings similar characters of reference indicate corresponding parts in the several views.

Figure 1 is a side elevation of my improved truck. Fig. 2 is a front end view of the same. Fig. 3 is a rear end view. Fig. 4 is a bottom plan view of the auxiliary truck.

1 designates the main truck provided with guide rods 2 and rails or tracks 3 mounted thereon and movable vertically between the guides, on which tracks is operated an auxiliary truck 4.

Loosely secured to the truck 1 are cog bars 5, and journaled in the front end of the rails or tracks 3 is a shaft 6 on which are secured cog wheels 7 intermeshing with the bars 5. On said shaft outside of said rails 3 is secured a ratchet wheel 8 and a crank 9, and 10 is a catch adapted to engage with the ratchet wheel 8 to hold the ratchet and its connections in any desired position.

Secured to the rear end of the rails 3 are cog bars 11, and secured to the truck 1 is a shaft 12 provided with cog wheels 13 intermeshing with the bars 11, and 14 is a ratchet wheel secured to said shaft 12, and 15 is a crank secured to said shaft, and 16 is a catch adapted to engage with said ratchet wheel 14, to hold the ratchet 14 and its connections in any desired position.

The wheels of the auxiliary truck 4 are pivotally secured to said truck and connected to each other by rods 17 and 18 pivotally secured to said wheels and crossing each other as shown, all for the purpose as will appear. To such wheels of said auxiliary truck I have provided a brake mechanism consisting of a brake rod 19 pivoted about the center of said truck and provided with a catch 20 adapted to fit into notches 21 in a strap 21' connected at the bottom of the member 4. Connected to said brake rod are links 22 suitably connected to brake bands 23 by means of toggle joints 24 so arranged that when the rod 19 is pulled the bands 23 will bear on the wheels of said truck and prevent their rotation.

In using my improved truck the auxiliary truck is loaded and when the train arrives the truck 1 is backed up to the train and the rails 3 raised by means of the cog wheel mechanism described and the auxiliary truck run off onto the train. Then a similar truck may be run off the train onto the truck 1, and thus the whole operation of loading and unloading the baggage consumes but a few moments, while in the present method it consumes a large quantity of time. After the loaded truck is run from the train to the truck 1 the brake is put on, thus preventing the same from running off from the rails or tracks 3 while moving, or in raising or lowering said rails. In the train or at any point the auxiliary truck may be held stationary by means of the brake mechanism described.

The mechanism of the rods 17 and 18 permit very short corners to be turned, since when the front wheels are turned in one direction the rear wheels turn in the opposite direction, thus making the turn.

I have now entered into a detailed description of the present and preferred embodiment of my invention. However changes in the details of construction may be resorted to within the scope of the appended claims without departing from the spirit of the invention.

Having thus described my invention what I claim as new and useful and desire to secure by Letters Patent is:

In a device of the class described, a main truck frame mounted upon bearing wheels and provided with spaced vertical guides, spaced rails movable vertically between said guides, independent means carried by said truck frame for vertically moving said rails at their ends, and a supplemental truck frame having carrier wheels and adapted to be disposed upon said main truck frame with its carrier wheels operating between and carried by said rails.

In testimony whereof I affix my signature in presence of two witnesses.

JAMES K. KENDRICK.

Witnesses:
    PERCY S. WEBSTER,
    JOSHUA B. WEBSTER.